United States Patent Office 2,975,174
Patented Mar. 14, 1961

2,975,174
11,18-LACTONE STEROID COMPOUNDS
James F. Kerwin, Broomall, and Manfred E. Wolff, Elkins Park, Pa., assignors to Smith Kline & French Laboratories, Philadelphia, Pa., a corporation of Pennsylvania
No Drawing. Filed Apr. 22, 1960, Ser. No. 23,926
8 Claims. (Cl. 260—239.57)

This invention relates to 11,18-lactone steroid compounds having more specifically a pregnane or allopregnane skeleton. Further, these compounds are characterized by the presence of a 20,21-diol moiety.

The 11,18-lactone steroids of this invention are aldosterone antagonists having diuretic activity. In addition these compounds are useful as intermediates to prepare the related diuretically active compounds having a 20-keto moiety and further aldosterone or hemiacetal congeners.

The novel compounds of this invention are illustrated by the following fundamental formulae:

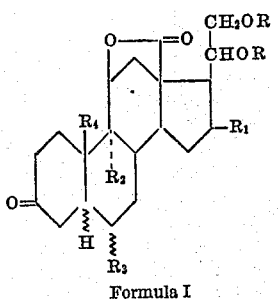

Formula I and

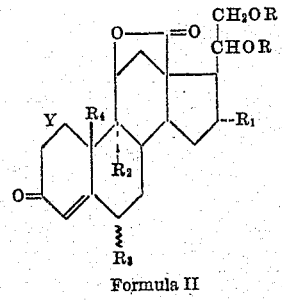

Formula II in which:
R is hydrogen or lower alkanoyl having from 2–7 carbon atoms, preferably hydrogen or acetyl;
$R_1$ is hydrogen or methyl;
$R_2$ is hydrogen or fluoro;
$R_3$ is hydrogen, methyl or fluoro, preferably $\alpha$;
$R_4$ is hydrogen or methyl, preferably methyl;
$\xi$ is either $\alpha$ or $\beta$; and
Y is an ethylene (—CH$_2$—CH$_2$—) bond or a vinylene (—CH=CH—) bond. When $R_4$ is hydrogen, Y is necessarily ethylene.

The compounds of Formulae I and II are prepared from the corresponding diacylates of 11,18-epoxy-pregnan-20,21-diols illustrated by the following reaction sequence:

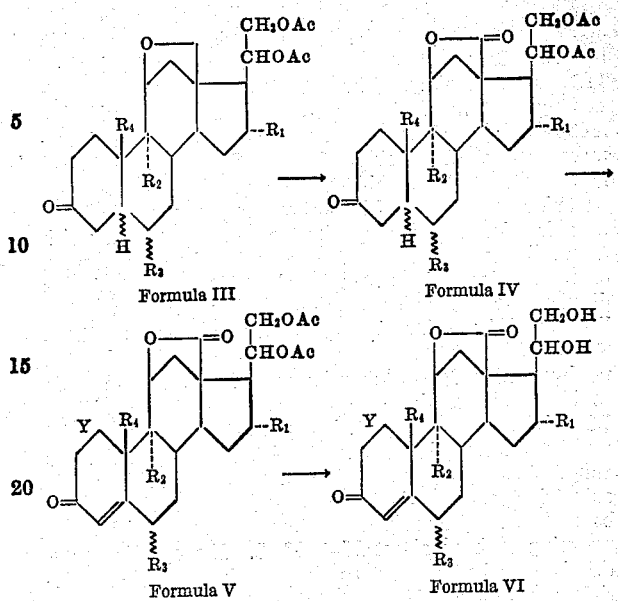

Formula III   Formula IV

Formula V   Formula VI in which $R_1$, $R_2$, $R_3$, $R_4$ and Y are as defined above, and Ac represents lower alkanoyl having from 2 to 7 carbon atoms.

The starting materials for the preparation of the novel diuretic agents of this invention, namely the diacylates of 11,18-epoxy-pregnan-20,21-diols represented by Formula III above, are obtained as described in our copending application, Serial No. 842,615, from quaternary salts of 18-dimethylamino-20-pregnenes which are in turn obtained as described in our copending application Serial No. 832,165, from quaternary conanine derivatives. The following briefly outlines the preparation of the starting materials of Formula III above as disclosed in both of the preceding noted copending applications.

A quaternary hydroxide derivative of a properly substituted conanine is heated at elevated temperatures under a vacuum to give as the decomposition product an 18-dimethylamino-20-pregnene. The latter compound is converted to a quaternary salt by reaction of the base with a reactive quaternizing agent such as an alkyl halide or methyl p-toluenesulfonate in a suitable organic solvent in which the reactants are substantially soluble such as benzene, toluene or acetonitrile usually by heating at reflux for several hours. Alternatively the quaternary salt can be prepared by exchanging the anion of, for example, the methiodide over a typical ion exchange resin.

The desired 11$\beta$-hydroxylated derivatives of the conanines can also be easily prepared by reducing their 3-acetoxy-11-keto congeners with lithium aluminum hydride in an ethereal solvent such as tetrahydrofuran.

The quaternary salt of 18-dimethylamino-20-pregnene essentially containing a $\beta$-hydroxyl substituent in the 11-position and a trialkylammonium cation at the 18-position is reacted with an excess of an alkaline reagent in a polar, strongly ionizing organic solvent, preferably anhydrous, in which the reactants are substantially soluble as well as with which the reactants are nonreactive such as the simple liquid formamides and acetamides as well as their N-loweralkyl derivatives, acetonitrile or a lower alkyl alcohol such as methanol or ethanol, preferably anhydrous N,N-dimethylformamide and N,N-dimethylacetamide. The alkaline reagent can be any strong base that converts the 11$\beta$-hydroxyl group of the steroid into a 11-alkoxide anion, preferably the lower alkali metal alkoxides of up to 6 carbon atoms especially sodium methoxide, sodium ethoxide, sodium tert.-butoxide and their potassium analogues. The reaction is run at temperatures of from about 50–250° C. preferably from about 75–175° C. but of course not exceeding the boiling point of the solvent for from 2–3 hours.

When the reaction is run as described above the 11β-alkoxide ion displaces the 18-trimethylammonium cation to result in the formation of 20-pregnenes having an 11,18-epoxy moiety. These compounds are then oxygenated at the 20,21-positions by suitable oxidation methods, preferably by reaction at moderate temperatures such as from about 25–50° C. for about 10–48 hours with at least stoichiometric quantities of osmium tetroxide, and preferably an excess, in an anhydrous organic solvent unreactive with the reactants and in which the reactants are substantially soluble such as a preferred ethereal solvent for example diethyl ether, tetrafuran, dioxane etc. Reaction condition other than those outlined have been found to give little further advantage. The resulting osmium esters are decomposed during the work-up of the reaction mixture such as by ethanolic sodium sulfite to give the 11,18-epoxy-3-keto-20,21-diols. The diols are then acylated to protect the sensitive diol moiety usually using an excess of an alkanoyl halide or anhydride of up to 7 carbon atoms, preferably acetic anhydride, with tertiary base usually in liquid tertiary base such as pyridine at room temperature or with slight warming such as about 25–100° C. The pyridine solution is quenched in water to give the diacyl starting materials of Formula III.

To prepare the novel compounds of this invention the diacylated 11,18-epoxypregnan-20,21-diol-3-one derivatives of Formula III are oxidized at the 18-position by a novel process which is described in a copending application, Serial No. 848,561. The reaction is run with at least a stoichiometric amount of ruthenium tetroxide and preferably an excess of this reagent. The reaction solvent is any organic solvent in which the reactants are substantially soluble and unreactive. Ruthenium tetroxide is a strong oxidizing agent which reacts with many common solvents such as alcohols, benzene and its derivatives, ethers etc. Especially preferred as solvents for the oxidation are halogenated hydrocarbons of less than 6 carbon atoms which are liquid at the reaction temperature or at ambient temperature such as chloroform, carbon tetrachloride, ethylene dichloride, tetrachloroethylene, etc. Alternatively the liquid lower ester solvents of less than 6 carbon atoms such as acetone or methyl ethyl ketone can be used.

The reaction is preferably run at about room temperature however temperatures of from about 10° C. to 120° C. can be used. Usually the reaction runs from 12 to 24 hours but a range of from about 1 hour up to 36 hours gives substantial oxidation. As with most organic reactions the length of reaction time varies with the reaction temperature conditions other than those described impart little additional advantage to the reaction. Usually the course of the reaction is followed by the appearance of a γ-lactone band at 5.6μ in the infrared spectrum of the reaction mixture.

As indicated herebefore the ruthenium tetroxide oxidizing agent reacts with many organic moieties such as hydroxyl groups as well as unsaturated or benzenoid systems therefore the 20,21-protective acyl groups must be carefully chosen. The oxidation reaction is a mild reaction which gives high yields of the selectively oxidized product, a 20,21-diacyloxy-11-hydroxy-3-keto-pregnan-18-oic acid, 11,18-lactone derivative of Formula IV. Removal of the acyl moieties by mild hydrolysis such as with an alkali metal carbonate or bicarbonate in aqueous methanol or ethanol gives the corresponding 20,21-diols.

These compounds have diuretic activity in their own right but are further converted to other diuretically active compounds of this invention by inserting double bond moieties in the A ring. Thus, the diacylated 11,18-lactone-pregnan-20,21-diol-3-ones (Formula IV) are reacted with bromine in acetic acid solution at ambient temperatures to form the 2,4-dibromo derivatives in the allopregnane series or 4-bromo in the pregnane series which are debrominated by consecutive reaction with sodium iodide and hydriodic acid or reaction with collidine. These are standard methods of introducing the double bonds into the steroid nucleus and give the diacylated 11,18-lactone-pregnen-20,21-diol-3-ones (Formula V). These compounds are deacylated by mild hydrolysis such as with an alkali metal carbonate or bicarbonate in aqueous methanol or ethanol to the diols (Formula VI).

The $\Delta^{1,2}$ double bond indicated by the symbol Y in the above formulae is introduced either by dehydrohalogenating the 2,4-dibromo intermediate obtained by brominating the diacylated 11,18-lactone-pregnan-20,21-diol-3-ones (IV) using an excess of collidine or by treating these compounds (IV) with selenium dioxide in acetic acid-tert. butanol. Of course the $\Delta^1$ compounds in the 19-nor series cannot be prepared because of aromatization.

It is to be noted that the compounds of Formulae IV, V and VI all fall within the scope of the more generic Formulae I and II.

The novel 11,20,21-trihydroxy-3-keto-4-pregnen-18-oic acid, 11,18-lactone derivatives of this invention (VI) are converted into other useful antialdosterones or diuretic products. Thus the 20,21-diols of Formula VI are monoacylated at the 21-hydroxy group using about one equivalent of an acylating agent such as an acyl anhydride or chloride in the presence of a tertiary base such as pyridine either in large excess of the base or with smaller amounts of base in a diluting solvent such as ethyl acetate, dioxane, ether etc. The acylation usually is run at moderate temperatures such as about 25° C. for from 4 to 60 hours. Alternatively the 21-hydroxy group is selectively etherified with chlorotriphenylmethane in pyridine solution to give the 21-triphenylmethyl ether. The resulting 21-acylates or 21-triphenylmethyl ethers are then oxidized at the 20-position, such as by using chromic acid in acid solution usually in acetic acid or sulfuric acid, to give the desired 21-acyloxy- or 21-triphenylmethoxy-3,20-diketo-11-hydroxypregnen-18-oic acid, 11,18-lactone derivatives which are antialdosterone or diuretic agents. These compounds are hydrolyzed by mild hydrolysis such as by a dilute acid for example hydrochloric acid or acetic acid in aqueous methanol or ethanol to the free 21-hydroxy compounds represented by the following structural formula which are also antialdosterone or diuretic agents:

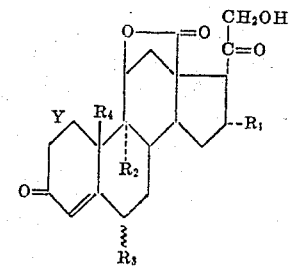

Formula VII in which Y, $R_1$, $R_2$, $R_3$ and $R_4$ are as defined above.

The compounds of Formula VII, in which at least one of $R_1$, $R_2$ and $R_3$ is substituted by a radical other than hydrogen, have exceptional activity and will be covered in a copending application. One compound of Formula VII has been reported in the prior art as having diuretic activity namely 11,21-dihydroxy-3,20-diketo-4-pregnen-18-oic acid, 11,18-lactone and its 21-acetate derivative, Wettstein et al., Angew. Chem., 69, 689 (1957).

The novel compounds of Formula VII when at least one of $R_1$, $R_2$ and $R_3$ is substituted by a methyl or fluoro moiety as defined hereabove and Y is ethylene are further converted into diuretically useful aldosterone or hemiacetal congeners. Thus, the 11,18-lactone derivatives are reacted with an excess of ethylene glycol and p-toluene sulfonic acid with moderate heating such as 50–100° C. and under vacuum to form the bisethylenedioxy derivatives at the 3,20-positions. The protected compound is then reduced with lithium aluminum hydride in purified dioxane-ether mixture at about 20–50° C. After decomposition of the aluminum complex, the desired 18-hydroxy analogue is obtained. The protective ethylenedioxy moieties are then removed by treatment with dilute acid such as hydrochloric acid in dioxane to give the desired 11,18 - epoxy-4-pregnen-18,21-diol-3,20-dione derivatives of Formula VIII below which are the desired diuretic compounds a portion of which will be the subject of a copending application. These compounds as well as others described hereabove also have progestational or corticoid activity depending on whether their basic structure resembles progesterone or the cortical hormones respectively.

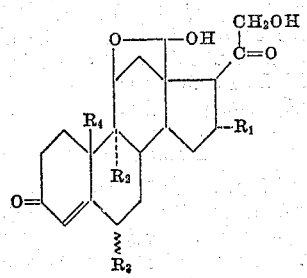

Formula VIII

In the above description the terms "pregnane" or "pregnene" are used generically to include the corresponding allo or 19-norpregnane structures as well as the normal series. The term "conanine" is used to define steroidal compounds which are pyrrolidine derivatives closed at the 18,20-positions having 20α or 20β as well as 5α or 5β configurations as well as N-lower alkyl substituents thereof. The structures of these compounds and their preparations are disclosed in our copending application, Serial No. 832,165. "Alkali metal" means any member of the metallic group usually included in this classification according to definition but with sodium and potassium preferred. The term "ethereal" when applied to a solvent means any saturated solvent possessing one or more ether linkages having a carbon maximum of 6 carbon atoms.

The definitions described hereinbefore have been limited for purposes of simplification for instance the halogen substituents in R₂ and R₃ are described as "fluoro" but bromo and chloro atoms could be substituted therefor. Also for instance the substituents at position 6 could be β as well as α to the ring. The 6β-substituents are isomerized to the 6α-position by exposure to base or acid. Reduction of the Δ⁴-progesterones used as a starting material also gives mixtures of allo and normal pregnanes, mostly allo.

The configuration of the A, B rings as is evident from the above description is immaterial since a Δ⁴ unsaturated system is usually formed giving the same product from either a pregnane or allopregnane compound. Actually the 3β-hydroxyallopregnane structure arise from the conanines while 3α-hydroxypregnanes arise from the 5β-conanines. These two preferred structures are more readily available as starting material.

For the purpose of simplification, the disclosure has been limited to the basic reactions and compounds necessary to practice this invention. Other specific details obvious to one skilled in the art will be even more readily apparent from the following examples. Of course variations and different sequences of reaction will be apparent to one skilled in the art but the overall basic reaction sequences described are only exemplary. All isomers not specifically mentioned but covered in the general structural formulas and names are meant to be included in this invention.

This application is a continuation-in-part of application Serial No. 842,615, filed September 28, 1959.

Example 1

A solution of 25 g. of 3β-acetoxy-11-ketoconanine in 300 ml. of tetrahydrofuran is added dropwise to a stirred solution of 11.6 g. of lithium aluminum hydride in 300 ml. of refluxing tetrahydrofuran. The mixture is stirred at reflux for one hour. After quenching with 46.4 ml. of water, the separated material is removed by filtration. The filtrate is concentrated to dryness on a rotating evaporator to leave a green oil. After dissolving the oil in 50 ml. of methanol and water is added, the crystalline solvate, 3β,11β-dihydroxyconanine, is obtained, M.P. 100–104° C.

A mixture of 18.5 g. of the dihydroxyconanine, 25.3 ml. of methyl iodide and 108 ml. of benzene is heated at reflux for two hours. An off-white crystalline precipitate forms. The mixture is diluted with ether and filtered. The filter cake is recrystallized from methanol to give 3β,11β-dihydroxyconanine methiodide, M.P. 277–279° C.

A solution of 82 g. of the methiodide in 350 ml. of methanol is passed through a column containing 251 g. of IRA–400 resin (hydroxide form, copending application, Serial No. 832,165). The methanolic eluate is evaporated under reduced pressure. The oily residue is heated to 170° C. and maintained there for 15 minutes. The residue after trituration with methanol is 18-dimethylamino-20-allopregnen-3β,11β-diol.

A solution of 52.9 g. of the 18-dimethylamino-20-allopregnene and 29 ml. of methyl iodide in 3 l. of acetonitrile is heated at reflux for 18 hours. The precipitate is the methiodide, M.P. 260° C.

A solution of 10 g. of 18-dimethylamino-20-allopregnen-3β,11β-diol methiodide in 100 ml. of dimethylformamide is treated with 10 g. of sodium methoxide and gently heated to reflux over an open flame. After 10 minutes, the reaction mixture is heated on a steam cone for 30 minutes, poured into 100 ml. of water, chilled and filtered. Recrystallization of the resulting solid from 70% methanol gives 11,18-epoxy-20-allopregnen-3β-ol, M.P. 144–145° C. Reaction of the 3β-ol (500 mg.) with an excess of acetic anhydride in pyridine with warming then quenching in water gives the acetate derivative.

The epoxy compound (330 mg.) in 5 ml. of acetone is treated with 0.28 ml. of 4 M chromic acid solution. The mixture is quenched in 50 ml. of water and several ml. of ethanol then chilled to give white crystals of 11,18-epoxy-20-allopregnen-3-one, M.P. 169–171° C.

A mixture of 3.6 g. of the epoxyallopregnenone, 3 g. of osmium tetroxide and 200 ml. of absolute ether is reacted for 48 hours. The black of osmium ester is suspended in 300 ml. of 60% aqueous ethanol containing 24 g. of sodium sulfite, refluxed for 4 hours and filtered. The filtrate is evaporated and the residue stirred with methylene chloride. The extract is washed with water dried and evaporated to give, after recrystallization from ethyl acetate, 11,18-epoxyallopregnan-20,21-diol-3-one, M.P. 212–215° C.

A solution of 920 mg. of the diol, 2 ml. of acetic anhydride and 2 ml. of pyridine is heated at 90° C. for 30 minutes. The solution is quenched in water, filtered and the resulting solid recrystallized from methanol to give the diacetate, M.P. 155° C.

A solution of 615 mg. of 11,18-epoxy-20,21-diacetoxyallopregnan-3-one in 15 ml. of carbon tetrachloride is treated with a slight excess of ruthenium tetroxide in carbon tetrachloride by standing at room temperature for 72 hours. The solution is filtered and the filtrate evaporated to give a residue of colorless needles, 20,21-diacetoxy-11β-hydroxy-3-ketoallopregnan-18-oic acid, 11,18 lactone, M.P. 225–229° C,

Example 2

A stirred solution of 9.3 g. of 20,21-diacetoxy-11β-hydroxy-3-ketoallopregnan-18-oic acid, 11,18-lactone (Example 1) in 120 ml. of acetic acid is treated with 34 ml. of 1.79 M hydrogen bromide in acetic acid and then with 4.95 g. of bromine in 25 ml. of acetic acid. After 10 minutes the solution is poured into 1 l. of water and the solid dibromide separated by filtration. The solid dibromide is added to a suspension prepared by dissolving 4.44 g. of bromine in 42 ml. of acetone, adding 3.4 g. of sodium carbonate, stirring and filtering, then adding 40 g. of sodium iodide followed by a brief reflux period. The resulting mixture is stirred for 2.5 hours, then 7.4 g. of oxalic acid dihydrate is added followed by refluxing for one hour. Ethyl acetate (400 ml.) and water (1 l.) are added. The organic layer is washed with water, 5% sodium bicarbonate and water. It is then stirred with 70 g. of zinc dust and 2 ml. of acetic acid, filtered and washed again. The filtrate is evaporated to give a solid which is taken up in 80 ml. of ethanol and acidified with 6 ml. of acetic acid. After addition of 3 g. of Girard's Reagent "T," the solution is boiled for 30 minutes, cooled to 20° C., treated with 37% formaldehyde and allowed to stand for 25 minutes. It is extracted with ethyl acetate. The water layer is acidified to pH 1 and allowed to stand for two hours. It was extracted with ethyl acetate. The second ethyl acetate extract is washed, dried and evaporated to give colorless crystals of 20,21-diacetoxy-11β-hydroxy-3-keto-4-pregnen-18-oic acid, 11,18-lactone.

A solution of 6.6 g. of the pregnene in 500 ml. of methanol and 200 ml. of water containing 6 g. of potassium bicarbonate and 10 g. of potassium carbonate is allowed to stand at 25° C. for 18 hours. The solution is poured into water to give the free diol which (3 g.) of dry pyridine and 1.4 g. of acetic anhydride. The mixture is kept at 25° C. for 60 hours then poured into water to separate the crude 21-acetate. This compound (18 mg.) in 1.7 ml. of acetic acid is reacted with 9 mg. of chromic acid in 0.17 ml. of acetic acid and 0.19 ml. of water. After one hour at 25° C., 0.1 ml. of ethanol is added and the reaction mixture quenched. The crystalline product is 21-acetoxy-11β-hydroxy-3,20-diketo-4-pregnen-18-oic acid, 11,18-lactone, M.P. 193° C.

The acetate (5 mg.) is shaken in 5 ml. of methanol-water containing 10 mg. of sodium carbonate overnight. Quenching the mixture gives the desired 11β,21-dihydroxy-3,20-diketo-4-pregnen-18-oic acid, 11,18-lactone.

Example 3

A solution of 3.1 g. of 20,21-diacetoxy-11β-hydroxy-3-ketoallopregnan-18-oic acid, 11,18-lactone in 150 ml. of tert.-butanol containing 1.5 ml. of glacial acetic acid is treated with 0.9 g. of selenium dioxide by refluxing for 24 hours under nitrogen. An additional 900 mg. of selenium dioxide is added and the reflux period repeated. The suspension is filtered and the filtrate evaporated. The filtrate residue is dissolved in ethyl acetate. The solution is washed with successive portion of 5% potassium bicarbonate solution, water, ammonium sulfide solution, cold 5% ammonium hydroxide solution, water, 1% hydrochloric acid and water. The residue from the washed extract is recrystallized to give 20,21-diacetoxy-11β-hydroxy-3-keto-1,4-pregnadien-18-oic acid, 11,18-lactone. A solution of 3.3 g. of the pregnadiene in 300 ml. of aqueous methanol containing 6 g. of sodium carbonate is held at room temperature overnight. After quenching the desired diol is recovered. This compound (900 mg.) is dissolved in 8 ml. of dioxane along with 4 ml. of pyridine and 0.042 g. of acetic anhydride. After 12 hours, the mixture is quenched to give the monoacetate which (40 mg.) is oxidized in 2 ml. of acetic acid with 20 mg. of chromic acid in acid water solution. After 2 hours, a small amount of ethanol is added and the reaction mixture quenched. The crystalline product is 21-acetoxy-11β-hydroxy-3,20-diketo-1,4-pregnadien-18-oic acid, 11,18-lactone.

Example 4

A mixture of 1 g. of 20,21-dipropionyloxy-11,18-epoxy-6α-fluoroallopregnan-3-one, a slight excess over the stoichiometric amount of ruthenium tetroxide in carbon tetrachloride is heated at reflux for 8 hours. The filtered solution is cooled and evaporated to leave a residue of 20,21-dipropionyloxy-6α-fluoro-11β-hydroxy-3-ketoallopregnan-18-oic acid, 11,18-lactone. This lactone (2 g.) is brominated, dehydrobrominated, deacylated, monoacetylated and oxidized as described in Example 2 to give 21-acetoxy-3,20-diketo-6α-fluoro-11β-hydroxy-4-pregnen-18-oic acid, 11,18-lactone. The free alcohol is obtained by gentle hydrolysis of the acetate (400 mg.) in 25 ml. of aqueous methanol containing hydrochloric acid.

Substituting 1 g. of 11,18-epoxy-6β-fluoropregnan-20,21-diol-3-one as the diacetate in the above reaction with an excess of ruthenium tetroxide in carbon tetrachloride at 40° C., for 36 hours gives the desired 11,18-lactone with a 6β-fluoro substituent.

Example 5

A mixture of 3 g. of 20,21-diacetoxy-11,18-epoxy-6β-methylpregnan-3-one, with an excess of ruthenium tetroxide in 100 ml. of carbon tetrachloride is allowed to stand for 36 hours. The mixture is filtered and the filtrate evaporated to give crystals of 20,21-diacetoxy-11β-hydroxy-6β-methyl-3-ketopregnan-18-oic acid, 11,18-lactone.

Example 6

20,21-diacetoxy-11β-hydroxy-6β-methyl-3-ketopregnan-18-oic acid, 11,18-lactone (3.1 g.) is dissolved in 35 ml. of dimethylformamide and treated with one molar equivalent of bromine in dimethylformamide dropwise until the bromine color persists. The monobromide obtained after quenching the mixture in water is heated with collidine to give 20,21-diacetoxy-11β-hydroxy-6β-methyl-3-keto-4-pregnen-18-oic acid, 11,18-lactone. A mixture of 2.1 g. of the ketone is hydrolyzed with sodium carbonate in aqueous ethanol. Quenching gives the diol which (1 g.) is reacted with 0.46 g. of acetic anhydride in 0.5 g. of pyridine and 20 ml. of dioxane. The reaction mixture is quenched after 24 hours to give the monoacetate. This compound (40 mg.) is oxidized with 18 mg. of chromic acid in 5 ml. of acetic acid. Quenching gives the desired α,β-mixture of 21-acetoxy-3,20-diketo-11β-hydroxy-6-methyl-4-pregnen-18-oic acid, 11,18-lactone. The acetate moiety is hydrolyzed by shaking 50 mg. of the mixture in dilute sodium carbonate solution with methanol to give the 21-ol. The 6α- and β-isomers are separated by chromatographic separation over an alumina column.

Example 7

A solution of 1 g. of the 2,4-dibromo derivative of 20,21-diacetoxy-11β-hydroxy-6β-methyl-3-ketopregnan-18-oic acid, 11,18-lactone (prepared by brominating as in Example 6 but using two equivalents of bromine) in 15 ml. of collidine is heated at reflux for 30 minutes. Ether is added to the cooled mixture. The filtered etheral extract is washed with dilute sulfuric acid, water and dried. The residue after evaporation of the solvent is purified by passing over a silicic acid column to give 20,21-diacetoxy-11β-hydroxy-6β-methyl-3-keto-1,4-pregnadien-18-oic acid, 11,18-lactone. This compound 1.0 g. is hydrolzed to the diol, monoacetylated and oxidized following the procedures described in Example 6 to give the mixture of isomeric 21-acetoxy-3,20-diketo-11β-hydroxy-6-methyl-1,4-pregnadien-18-oic acid, 11,18-lactones which are hydrolyzed to the 21-ol and separated by chromatography.

Example 8

The diacetate of 11,18-epoxypregnan-20,21-diol-3-one (500 mg.) in carbon tetrachloride is oxidized with an excess of ruthenium tetroxide (750 mg.) at 30° C. for 48 hours to give 20,21-diacetoxy-11β-hydroxy-3-ketopregnan-18-oic acid, 11,18-lactone.

Example 9

A mixture of 30 g. of 20,21-diacetoxy-11,18-epoxy-16α-methylpregnan-3-one, 30 g. of ruthenium tetroxide and 150 ml. of carbon tetrachloride is heated at 50° C. for 24 hours. The reaction filtrate is evaporated to give 20,21-diacetoxy - 11β - hydroxy - 16α - methyl-3-ketopregnan-18-oic acid, 11,18-lactone. This compound (20 g.) monoacetylated, dehydrobrominated, hydrolyzed, monoacetylated and oxidized with chromic acid in acetone as described in Example 6 to give 21-acetoxy-11β-hydroxy-16α-methyl - 3,20 - diketo-4-pregnen-18-oic acid, 11,18-lactone.

Another portion (1 g.) of the 2,4-dibromo compound prepared by brominating the 4-monobromo compound with one molar equivalent of bromine is reacted with 15 ml of collidine at reflux for 45 minutes. After treatment with ether and purification of the product by silicic acid chromatography the diacetate of 11β-hydroxy-16α-methyl-3-keto-1,4-pregnadien-20,21-diol-18-oic acid, 11,18-lactone is obtained. This compound is hydrolyzed to the diol with carbonate, monoacetylated and oxidized with chromic acid to give 21-acetoxy-11β-hydroxy-16α-methyl-3,20-diketo-1,4-pregnadien-18-oic acid, 11,18-lactone.

Example 10

A mixture of 1 g. of the diacetate of 11,18-epoxy-9α-fluoroallopregnan-20,21-diol-3-one, an excess of ruthenium dioxide and 75 ml. of carbon tetrachloride is reacted at 40° C. for 48 hours. The filtered solution is evaporated to leave 20,21-diacetoxy-9α-fluoro-11β-hydroxy-3-ketoallopregnan-18-oic acid, 11,18-lactone. This lactone (4 g.) is brominated with 11 ml. of 1.8 M hydrogen bromide and 1.65 g. of bromine in acetic acid, then reacted with sodium iodide-hydriodic acid to give the Δ⁴ compound. This compound (2.5 g.) is hydrolyzed in methanolic carbonate, mono acetylated with one equivalent of acetic anhydride in pyridine and oxidized with chromic acid in acetone at room temperature to give 21-acetoxy-9α-fluoro - 11β - hydroxy-3,20-diketo-4-pregnen-18-oic acid, 11,18-lactone. The alcohol is prepared by hydrolysis of the acetate in methanolic hydrochloric acid solution.

A solution of 1.6 g. of the 20,21-diacetoxy lactone in 80 ml. of tert.-butanol containing 1 ml. of acetic acid is treated with 0.9 g. of selenium dioxide by refluxing for 36 hours. The reaction filtrate is worked up as in Example 3 to give 20,21-diacetoxy-9α-fluoro-11β-hydroxy-3-keto-1,4-pregnadien-18-oic acid, 11,18-lactone. This compound (1.6 g.) is hydrolyzed, monoacylated and oxidized as in Example 3 to give 21-acetoxy-9α-fluoro-11β-hydroxy-3,20-diketo - 1,4 - pregnadien - 18 - oic acid, 11,18-lactone. The 21-hydroxy compound is obtained by shaking 500 mg. of this compound in 50 ml. of methanolic carbonate.

Example 11

A solution of 3 g. of 11,18-epoxy-20,21-diacetoxy-19-norallopregnan-3-one in 100 ml. of carbon tetrachloride is treated with a slight excess of ruthenium tetroxide at 25° C. for 48 hours. The reaction filtrate is evaporated to give 20,21-diacetoxy-11β-hydroxy-3-keto-19 - norallopregnan-18-oic acid, 11,18-lactone.

A stirred solution of 1.0 g. of the diacetoxy lactone is brominated in acetic acid by 3.4 ml. of 1.79 M hydrogen bromide solution and 0.5 g. of bromine to yield the 2,4-dibromide which is dehydrohalogenated with sodium iodide-hydriodic acid to the Δ⁴ compound. This pregnene (1.2 g.) is shaken with 100 ml. of alcohol-sodium carbonate solution to the diol, monoacetylated with 1 mole equivalent of anhydride in pyridine and oxidized with chromic oxide in acetic acid as in Example 2 to yield 21-acetoxy-11β-hydroxy-3,20-diketo-19-nor - 4 - pregnen-18-oic acid, 11,18-lactone. This compound (50 mg.) is shaken with sodium carbonate solution to give the 21-hydroxy compound.

Substituting 11,18-epoxy-6α-fluoro-19 - norallopregnan-3-on-20,21-diol diacetate in the reactions as described above the following compounds are prepared: 20,21-diacetoxy - 6α - fluoro - 11β - hydroxy - 3-keto-19-norallopregnan-18-oic acid, 11,18-lactone and 21-acetoxy-11β-hydroxy - 6α - fluoro - 3,20 - diketo-19-nor-4-pregnen-18-oic acid, 11,18-lactone, and its 21-ol.

Example 12

A solution of 5 g. of 11,18-epoxy-6β,9α-difluoro-20,21-diacetoxy-allopregnan-3-one in 150 ml. of carbon tetrachloride is treated with ruthenium tetroxide at 50° C. for 18 hours. The reaction filtrate is evaporated to give 20,21 - diacetoxy - 11β - hydroxy - 6β,9α - difluoro - 3-keto-allopregnan - 18 - oic acid, 11,18 - lactone. The lactone is brominated, dehydrobrominated, hydrolyzed, monoacetylated and oxidized with chromic acid as described in Example 2 to give 21-acetoxy-6α,9α-fluoro-11β-hydroxy-3,20-diketo-4-pregnen-18-oic acid, 11,18-lactone.

Example 13

A solution of 1.2 g. of 3,20-diketo-6α-fluoro-11β,21-dihydroxy-4-pregnen-18-oic acid, 11,18-lactone (Example 4), 250 ml. of ethylene glycol and 60 mg. of p-toluenesulfonic acid is heated at 80° C. under 0.2 mm. pressure until the volume is reduced to 50 ml. The product is isolated by extraction with chloroform. A solution of 900 mg. of the 3,20-bisethylenedioxy compound in 100 ml. of purified dioxane is treated dropwise with 1.5 of lithium aluminum hydride in 150 ml. of ether. The mixture is heated at reflux for 15 minutes and treated with 7 ml. of water. The reaction filtrate is evaporated to give the hemiacetal. A solution of 1 g. of this compound in 20 ml. of dioxane is treated with 2 ml. of concentrated hydrochloric acid and 10 ml. of water. After standing for four hours the mixture is diluted with water to give 11,18-epoxy - 6α - fluoro - 4 - pregnen-18,21-diol-3,20-dione.

Example 14

A solution of 11 g. of 21-acetoxy-11β-hydroxy-3,20-diketo-19-nor-4-pregnen-18-oic acid, 11,18-lactone (Example 11) in 4 l. of methanol is treated with 150 ml. of concentrated hydrochloric acid for 24 hours at 25° C. Water (2 l.) is added and the methanol removed in vacuo. The suspension is treated with 2 l. of acetone and allowed to stand for 18 hours at 20° C. The acetone is removed. The remaining aqueous phase is extracted with chloroform to give the 21-ol. This compound (2.3 g.), 350 ml. of ethylene glycol and 120 mg. of p-toluenesulfonic acid is heated at 90° C. under 0.4 mm. pressure as in Example 16 to give the bisethylenedioxy compound. A solution of 1.8 g. of this compound in 250 ml. of dioxane with 3 g. of lithium aluminum hydride in 150 ml. of ether is refluxed for 30 minutes. After quenching, the reduced product is obtained. This compound (2.5 g.) in 50 ml. of dioxane is treated with 4 ml. of hydrochloric acid. Diluting with water gives 11,18-epoxy-19-nor-4-pregnen-18,21-diol-3,20-dione.

Example 15

A solution of 3.6 g. of 9α-fluoro, 11β,21-dihydroxy-3,20-diketo-4-pregnen-18-oic acid, 11,18-lactone is reacted with ethylene glycol in the presence of p-toluenesulfonic acid, reduced with 4 g. of lithium aluminum hydride in dioxane-ether and hydrolyzed with dilute acid to give 11,18 - epoxy - 9α - fluoro - 4 - pregnen - 18,21 - diol-3,20-dione all as described in Example 13.

What is claimed is:
1. A chemical compound selected from the group con- sisting of compounds having the following fundamental structures:

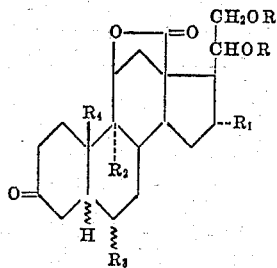

and

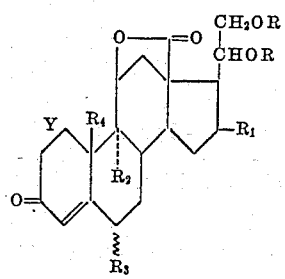

in which Y is a member selected from the group consisting of ethylene and vinylene; R is a member selected from the group consisting of hydrogen and lower alkanoyl having from 2 to 7 carbon atoms; $R_1$ is a member selected from the group consisting of hydrogen and methyl; $R_2$ is a member selected from the group consisting of hydrogen and fluoro; $R_3$ is a member selected from the group consisting of hydrogen, methyl and fluoro; $R_4$ is a member selected from the group consisting of methyl and, when Y is ethylene, hydrogen; and ⌇ is a configurational position selected from the group consisting α and β.

2. A pregnane compound having the following fundamental formula:

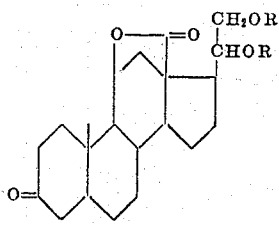

in which R is lower alkanoyl having from 2 to 7 carbon atoms.

3. A pregnene compound having the following fundamental formula:

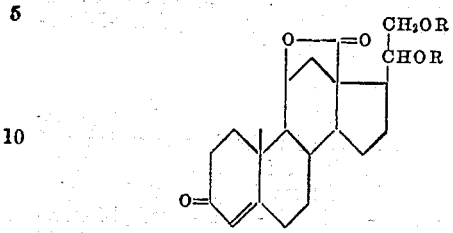

in which R is lower alkanoyl having from 2 to 7 carbon atoms.

4. A pregnadiene compound having the following fundamental formula:

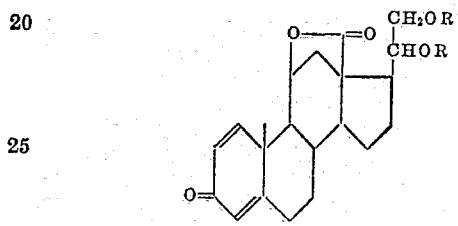

in which R is lower alkanoyl having from 2 to 7 carbon atoms.

5. 20,21 - diacetoxy - 11β - hydroxy - 3 - ketoallopregnan-18-oic acid, 11,18-lactone.

6. 11β,20,21 - trihydroxy - 3 - keto - 4 pregnen - 18-oic acid, 11,18-lactone.

7. 21 - acetoxy - 11β,20 - dihydroxy - 3 - keto - 4-pregnen-18-oic acid, 11,18-lactone.

8. 20,21 - diacetoxy - 11β - hydroxy - 3 - keto - 19-nor-4-pregnen-18-oic acid, 11,18-lactone.

No references cited.